United States Patent Office 2,896,732
Patented July 28, 1959

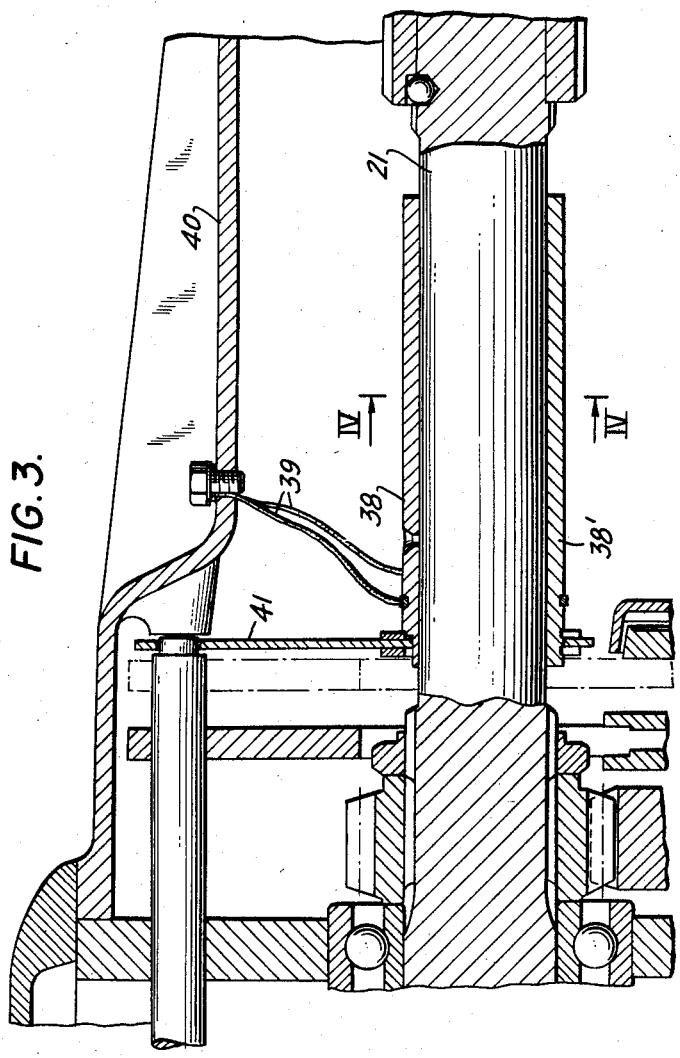
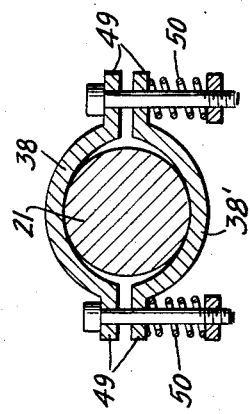
FIG. 3.
FIG. 4.

2,896,732

DEVICES FOR SUPPRESSING PARASITIC CURRENTS IN VEHICLES WITH ELECTROMAGNETIC CLUTCHES

Jean Maurice and Michel Rist, Paris, France, assignors to Societe Anonyme Française du Ferodo, Paris, France, a corporation of France Application April 16, 1957, Serial No. 653,189

11 Claims. (Cl. 180—70)

The applicants have found that during periods of slip, friction clutches give rise to high-frequency currents. This phenomenon of little known origin in frictional electricity, while it is not considerable in clutches with mechanical actuation, assumes quite large and troublesome proportions in the case of clutches with electromagnetic control, no doubt due to the influence of the magnetic field which exists in the zone of friction. Currents may also sometimes be generated in certain conducting parts of the clutch by the sweeping action of a leakage field, the strength of which varies in accordance with the angle. In any case, the production of substantial stray currents is encountered in radio-electric receivers mounted on a vehicle.

On the other hand, it has appeared from researches made by the applicants in the analysis of this phenomenon, that the stray currents collected by the antenna of the radio-electric receiver are mainly radiated by the wheels of the vehicle, which form real transmitting aerials for the high-frequency currents in question.

The present invention has for its object to eliminate or to reduce the drawbacks which are likely to result from the production of high-frequency currents in friction clutches, mainly those with electro-magnetic control, and in particular the jamming of radio-electric installations mounted on or in the vicinity of vehicles.

Using as a basis the discovery on the one hand of the fact that the high-frequency currents referred to have their origin in the friction zone of the clutch, and on the other hand of the fact that the radiation of parasitic waves due to these currents is mainly effected by the wheels, to which the said currents are conducted by the transmission, the invention consists essentially in arranging the transmission in such manner as to ensure the return of the said currents to their source before they have been able to reach the wheels, while introducing the minimum amount of loss by friction.

In one form of embodiment of the invention, the transmission is interrupted by an insulating element in order to insert a high resistance having a negligible capacity in the electric line constituted by the said transmission, which prevents the propagation of the high-frequency current to the wheels, and causes the emission of the radiation to be effected by the member or members located on the forward side of the said interruption, the position of which is chosen in such manner that the radiation thus effected is practically absorbed by the chassis and the ground.

In accordance with a further form of embodiment, the greater part of the stray currents is caused to pass to earth through a de-coupling condenser which has a surface coupled to a member of the transmission, and a surface coupled to the chassis with the interposition between the two surfaces of a dielectric formed by air and/or lubricant.

In accordance with still a further alternative form, in which one or a number of suitable members of the transmission are definitely earthed, the high-frequency stray currents are permitted to flow away towards the earth of the chassis by the free end face of one of the transmission shafts, such as the shaft of the gear-box, the back-axle shaft or the like, preferably in the vicinity of the centre of the said face.

More particularly, such an earthing system is effected by the elastic contact on a stud connected to the chassis, of a ball which is engaged in a conical seating in the extremity of the said shaft, the said seating being formed by the same hole which has been employed for the centering of the shaft on a lathe at the moment of machining. The materials used for the contact stud and the ball are chosen so as to have different degrees of hardness. The supporting surface of the stud is flat, convex or concave and, if it is concave, has a radius of curvature greater than that of the ball.

The features and advantages of the invention will furthermore be brought out from the description which follows below of forms of embodiment selected by way of example, reference being made to the accompanying drawings, in which.

Figure 5:
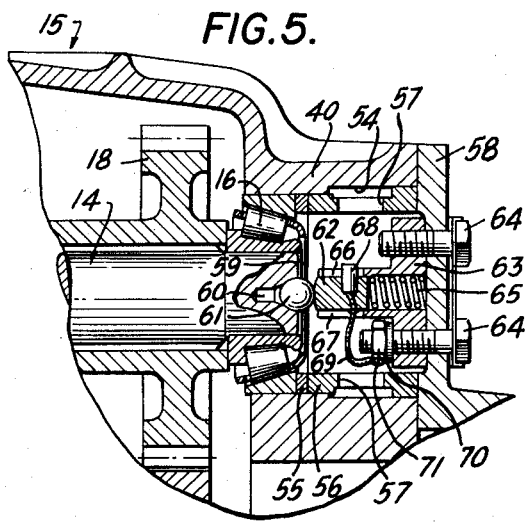
Figure 6:
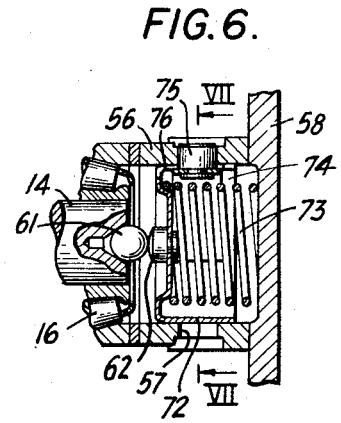
Figure 7:
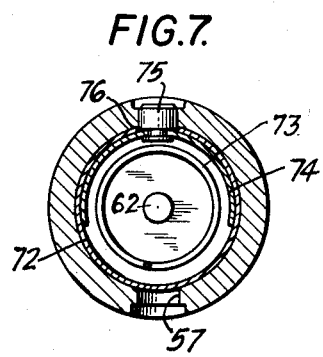
Figure 8:
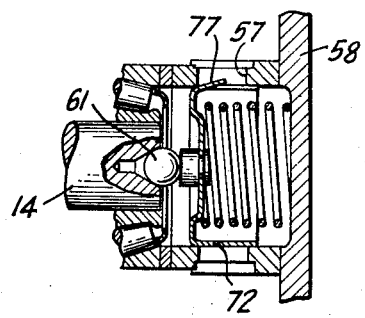
Figure 9:
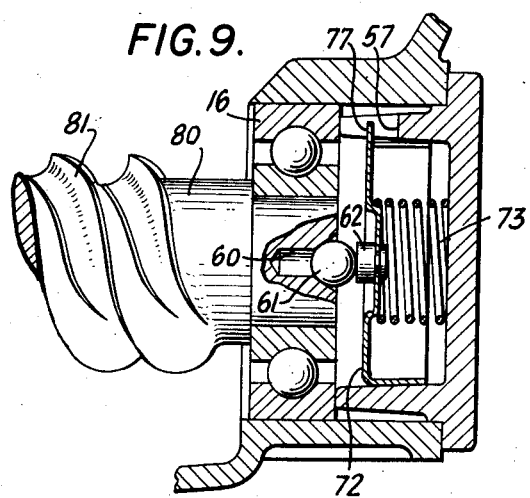

Fig. 3 relates to a further form of de-coupling condenser;

Fig. 4 is a partial view corresponding, in transverse cross-section taken along the line IV—IV of Fig. 3;

Fig. 5 is a view in longitudinal cross-section of a further device in accordance with the invention shaped with a view to effecting a complete earthing, and applied at the shaft end of the gear-box;

Fig. 6 is a view similar to that of Fig. 5, but relating to an alternative form of the device which is shown therein;

Fig. 7 is a view of this alternative form in transverse cross-section along the line VII—VII of Fig. 6;

Fig. 8 is a view similar to that of Fig. 5 or Fig. 6, but relating to a further alternative form;

Fig. 9 illustrates in application of the arrangement of Fig. 8 to a shaft of the back axle.

Figure 1:
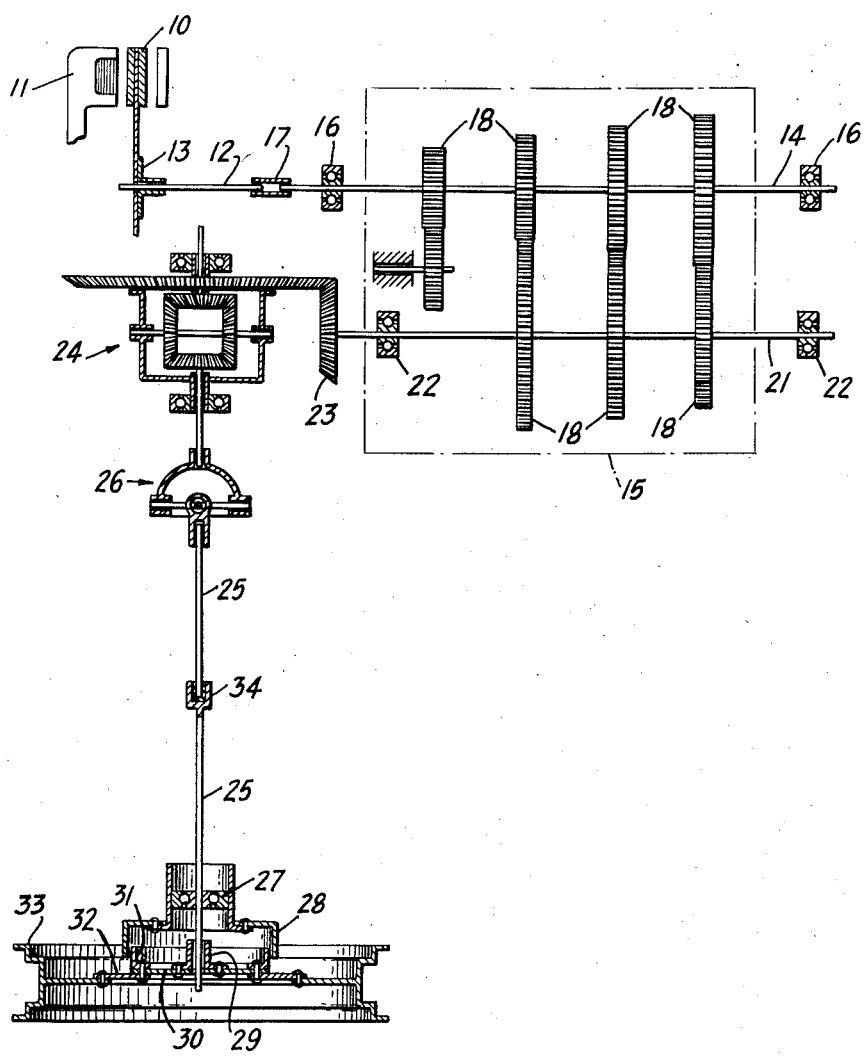
Fig. 1 is a diagrammatic view of an automobile transmission provided with a device in accordance with the invention, in the form of an insulating member.

In the form of embodiment shown by way of example only and without implied limitation in Fig. 1, there can be seen at 10 the friction disc of an electro-magnetic clutch 11, and at 12 the driven shaft of this clutch, on which the disc 10 is mounted by means of splines 13. The primary shaft 14 of the gear-box 15 is mounted on bearings 16 and is coupled to the shaft 12 by a splined sleeve 17. There can be seen at 18 the various pinions of the gear-box 15. The secondary shaft 21 of the box 15 is mounted on bearings 22 and carries the driving pinion 23 of the differential crown-wheel 24. Each driving-wheel shaft 25 which leaves the differential 24 comprises a Cardan coupling 26 and is centered by a bearing 27 with respect to a drum 28. The wheel which is mounted by a splined hub 29 on the shaft 25 comprises a side plate 30, a movable brake-drum 31, a spider 32 and a rim 33.

In accordance with the invention, an insulating joint 34 is incorporated in the shaft 25 and separates it into two parts completely insulated from each other in such manner that the electrical capacity of the condenser thus formed may be as small as possible. The joint 34 may consist for example of a tubular dielectric lining which grips one of the parts of the shaft 25 and is gripped by the other hollow portion, as shown in Fig. 1. As an alternative, a joint of this kind may be formed between two coupled and insulated flanges.

Between the periods of slip of the clutch 11, the friction at the disc 10 gives rise to the production of parasitic currents of high-frequency, the emission of which is accentuated by the presence of the magnetic field created by the clutch 11. This phenomenon is produced in the same way both with insulating clutch linings and with conductive linings; the parasitic currents are especially propagated in the shaft 12. The passage of these currents is in practice not prevented either by the splines such as 13 and 17, or by the teeth at 18 and 23, or by the various bearings such as those of the differential 24 and the Cardan couplings 26, because of the substantial metallic surfaces in contact, the oil film, where this exists, playing only the part of a very thin dielectric of a condenser.

On the other hand, the bearings such as 16 do not provide any appreciable shunting of the current to earth, since the contacts between the balls and their cages are essentially point contacts.

An appreciable part of the high-frequency currents produced at the source 10 is thus transmitted to each shaft 25 and would be liable to be radiated by the corresponding wheel assembly 29—30—31—32—33, if it were not effectively prevented by the interruption formed by the joint 34 in accordance with the invention. This joint causes in fact a premature radiation of the parasitic waves which, at this sheltered point under the vehicle, are practically absorbed by the chassis and the ground.

The joint 34 which has been shown on the shaft 25 in Fig. 1 may also be provided at any other suitable position between the disc 10 and the wheel 33.

Figure 2:
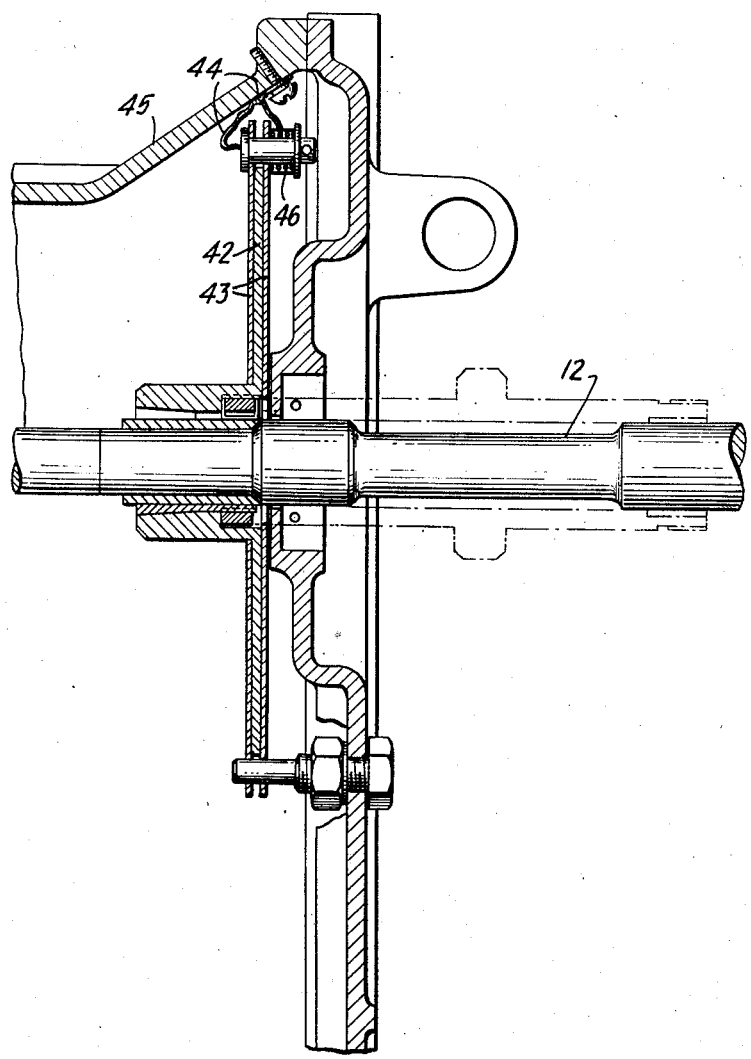
Fig. 2 is a view to a larger scale of an alternative form comprising a de-coupling condenser.

Reference will now be made to Fig. 2 in which the return to earth of the stray currents is effected by means of a de-coupling condenser. In accordance with the construction shown in Fig. 2, a circular plate 42 is mounted on the shaft 12 and is electrically connected to the said shaft. The plate 42 is inserted, with the interposition of oil films, between two other plates 43 connected at 44 to the casing 45 which forms the earth. Light springs 46 ensure a suitable application of the plates 42 and 43, the separating oil films of which form the dielectrics of condensers.

In the alternative form shown in Figs. 3 and 4, the de-coupling condenser acts along the shaft 21 and comprises a bronze sheath in two parts 38 and 38' which are connected to earth and closely surround the shaft 21. The parts 38 and 38' are preferably obtained by milling a cylindrically bored member and have or receive longitudinal projecting edges 49 which enable them to be brought together by an elastic force applied at 50. This force is adjustable and is so chosen that the parts 38 and 38' are brought as close together as possible in a plane at right angles to the edges 49, without however forcing out the oil film from between the shaft 21 and the parts 38 and 38'. In this way, there is obtained a substantial increase in the capacity of the assembly of the device. Any other arrangement could also be adopted with a view to bringing any earthed member close to the shaft 21 in such manner that the minimum space necessary for the maintainance of an oil film may be obtained.

The parts 38 and 38' of the sheath are in this case connected by conductors 39 to the earthed casing 40. The sheath 38—38' is prevented from rotating with respect to the casing 40 by means of a dog 41.

Reference will now be made to Fig. 5, in which a direct connection to earth is provided at the end of a shaft of the gear-box 15. There is again shown at 14 the primary shaft of the box 15, or more precisely the free extremity of this shaft which is on the opposite side to the clutch 11, at 18 a pinion mounted on the shaft 14, at 16 the bearing which is of the conical roller type, for supporting the shaft end 14. There is also seen at 40 the casing of the gear-box in which is mounted the bearing 16.

In the form of embodiment shown in Fig. 5 which relates by way of non-restrictive example to a gear-box of a type employed in touring vehicles of low power, the casing is provided facing the shaft 14 with a cylindrical passage 54 which receives successively the bearing 16, a washer 55, and a ring 56 in which are formed two opposite holes 57. The washer 55 and the ring 56 serve as a stop for the bearing 16, and are themselves supported against the cover 58 of the casing 40 which closes the passage 54.

By its construction, the shaft 14 is provided at its end face 59 with a hole 60 which has been used to center it during its machining. The deeper portion of the hole 60 is cylindrical but the opening is conical with an opening angle of 60°.

In accordance with the invention, a spherical ball 61 of hard steel is engaged in the hole 60, and has a diameter which is chosen so that it bears effectively against the conical wall of the hole, thus forming for it a conical seating. Against the ball 61 is applied the flat face of a pressure member or stud 62 of conducting material which is less hard than steel, such as brass or bronze for example. The pressure member 62 is formed by a small piston slidably engaged in the cylindrical bore of a socket 63 which is provided with a flange and is fixed by screw 64 to the wall 58. The bore of the socket 63 is co-axial with the shaft 14. A helical spring 65 is engaged in this bore and is supported against the cover 58 to apply on the piston 62 a thrust action in the direction of the ball 61.

At the level of the thrust member 62, two opposite slots parallel to the axis of the socket 63 are formed in this socket, one of which 66 forms a guide for a stud 68 fixed to the thrust device 62, while the other 67 serves to free a passage for an electric cable 69. The cable 69 is fixed and connected to the pressure device 62 by spot welding. It terminates in a thimble 70 which is clamped against the socket 63 by means of a nut 71 screwed on one of the screws 64.

In operation, the shaft 14 rotates while the pressure device 62 is prevented from turning by the stud 68. In practice, the ball 61 becomes jammed in its conical seating 60 and thus virtually becomes integral with the shaft 14. It rotates on application against the extremity of the pressure device 62. Between the pressure device 62 and the ball 61, there is formed in due course, by reason of the differences in their hardness, a small depression with a high surface polish which improves the quality of the contact at this point. With the arrangement in accordance with the invention, the earthing connection has been found to be excellent for parasitic currents of high frequency which especially results in a much improved sound reproduction of the radio receiver fitted to the vehicle. It will be appreciated that, in a remarkable manner, the contact 61—62 thus has a very much higher effectiveness for the conduction to earth of the parasitic currents than that offered by the ball bearings (which are numerous) mounted on the transmission, and in particular the bearing 16 which is quite close.

In the alternative form shown in Figs. 6 and 7, the arrangement is similar to that which has just been described with reference to Fig. 5, except that the stud 62 is mounted, not in the same way as a piston in a cylinder, but on a cup 72. The latter is slidably fitted in the internal bore of the ring 56, and is subjected to the action of a helical spring 73 which is supported against the cover 58. A semi-circular elastic blade 74 is engaged in the cup 72 and is shaped to the internal contour of this cup. On the centre of the blade 74 is riveted a pawn 75 which passes through an elongated slot 76 formed in the cup, and which is engaged in one of the holes 57 so as to prevent any undesired rotation of the assembly 72—73—74—62.

In a further alternative form shown in Fig. 8, the arrangement is again similar to that which has been described with reference to Figs. 6 and 7, but the locking means for the cup have been modified. They consist in this case of a tongue 77 which is punched out of the cup 72 and suitably bent outwards so as to engage in one of the holes 57, while permitting the sliding movement of the cup 72.

Reference will now be made to Fig. 9 which relates to an application of the invention, not to a primary shaft of a gear-box, but to a shaft 80 of a rear axle 81 of the endless screw type. The earthing device is substantially the same as that which has been described above with reference to Fig. 8. There is again shown in Fig. 9, at 60, the conical hole in the shaft end, at 61 the ball, at 62 the pressure device and at 72 the cup with its tongue 77 in the hole 57 and its spring 73.

What we claim is:

1. In an automotive vehicle having a chassis, an electromagnetic clutch including a friction disc, a gear box including primary and secondary shafts, said primary shaft being driven by said disc, a differential driven by said secondary shaft, wheels, lateral shafts driven by said differential and driving said wheels, said shafts and differential forming a mechanical transmission between said disc and said wheels having an appreciable electrical conductivity, and bearing means for supporting said transmission under said chassis, a device for preventing parasitic high-frequency electric currents produced in the vicinity of said friction disc to reach along said transmission to said wheels, said device comprising a conductibility releasing means located in said transmission at a point under said chassis far remote from said wheels.

2. A device as defined in claim 1 wherein said releasing means is an aerial means comprising an insulating member.

3. A device as defined in claim 1 wherein said releasing means is a condenser means having one plate coupled to said transmission, another plate connected to said chassis, and a dielectric substance interposed between said plates.

4. A device as defined in claim 1 wherein said releasing means is a slip-connector means connecting said transmission with said chassis.

5. A device as defined in claim 4, wherein said slip-connector means connects one of the primary and secondary shafts of the gear-box with said chassis.

6. A device as claimed in claim 5 wherein said shaft has an end presenting a conical recess, and said slip connector means has a ball engaged in said recess, a pressure member mounted on said chassis and guided for movement parallel to said shaft, and a spring means urging said member into contact with said ball.

7. A device as claimed in claim 6, in which the said pressure member comprises a piston slidably mounted in a socket; and means for preventing rotation of said piston with respect to the said socket, said means comprising a stud on the pressure member adapted to engage in a slot formed in the said socket.

8. A device as claimed in claim 6, in which the said pressure member is grounded to the chassis by an electric cable; spot welding means connecting said cable to said pressure member; and a thimble on the other extremity of said cable, connected to said chassis by clamping by a nut.

9. A device as claimed in claim 6, and further comprising a cup; means for mounting said pressure member on said cup; and a cylindrical passage formed in the said chassis and adapted to slidably receive the said cup.

10. A device as claimed in claim 6, in which the said pressure member is mounted on a cup; a cylindrical passage formed in the said chassis and adapted to slidably receive the said cup; means for preventing rotation of the said cup, said means comprising a pawn fixed to an elastic blade adapted to the internal profile of the said cup; a passage in said chassis adapted to receive the said cup; and an elongated slot formed in the said cup to permit the passage of the said pawn.

11. A device as claimed in claim 10, in which said cup is locked in position for rotation by engagement in the said passage of a tongue punched out of the cup and bent outwards.

References Cited in the file of this patent
UNITED STATES PATENTS

| | | |
|---|---|---|
| 1,120,984 | Thompson | Dec. 15, 1914 |
| 2,047,838 | Smith | July 14, 1936 |
| 2,104,800 | Grandy | Jan. 11, 1938 |
| 2,490,329 | Wilde | Dec. 6, 1949 |